United States Patent
Kwoka

(10) Patent No.: US 6,443,282 B1
(45) Date of Patent: Sep. 3, 2002

(54) APPARATUS AND METHOD FOR CONTROLLABLE VISCOUS COUPLING

(75) Inventor: Georg Kwoka, Much (DE)

(73) Assignee: GKN Viscodrive GmbH, Lohmar (DE)

( * ) Notice: Subject to any disclaimer, the term of this patent is extended or adjusted under 35 U.S.C. 154(b) by 0 days.

(21) Appl. No.: 09/556,756

(22) Filed: Apr. 21, 2000

(30) Foreign Application Priority Data

Apr. 23, 1999 (DE) .......................................... 199 18 411

(51) Int. Cl.[7] ........................... F16D 47/06; F16D 35/00
(52) U.S. Cl. ....................... 192/57; 192/48.4; 192/58.42
(58) Field of Search ........................... 192/48.3, 48.4, 192/48.7, 54.52, 57, 58.42

(56) References Cited

U.S. PATENT DOCUMENTS

| | | | | |
|---|---|---|---|---|
| 4,885,957 A | * | 12/1989 | Taureg et al. ................... | 475/89 |
| 4,899,859 A | * | 2/1990 | Teraoka ....................... | 192/221 |
| 5,080,210 A | * | 1/1992 | Hagiwara ................... | 192/48.3 |
| 5,464,084 A | * | 11/1995 | Aoki et al. .................... | 192/35 |

FOREIGN PATENT DOCUMENTS

| | | | | |
|---|---|---|---|---|
| DE | 37 26 207 A 1 | | 2/1988 | |
| DE | 38 34 555 C 1 | | 9/1989 | |
| DE | 40 36 230 C 2 | | 5/1991 | |
| DE | 40 10 678 A 1 | | 10/1991 | |
| JP | 64-58820 A | * | 3/1989 | ............... 192/57 |
| JP | 2-26328 A | * | 1/1990 | ............... 192/57 |

OTHER PUBLICATIONS

Patent Abstracts of Japan, vol. 16/No. 262 (M–1265), abstract of JP 4–64728 (A), Jun. 15, 1992.*

* cited by examiner

Primary Examiner—Richard M. Lorence

(57) ABSTRACT

A viscous coupling for lockingly connecting two parts which are rotatable relative to one another, having the following characteristics: a first coupling part is provided in the form of a rotational housing; a second coupling part is provided in the form of a hub; the first coupling part and the second coupling part are arranged so as to be rotatable relative to one another and, while being positioned co-axially inside one another, together form a sealed annular chamber; inside the chamber, there are arranged axially-alternating first coupling plates in the shape of annular discs with means for providing a non-rotatable connection with the first coupling part, and second coupling plates in the shape of annular discs with means for providing a non-rotatable connection with the second coupling part; otherwise, the annular chamber is at least partially filled with a viscous fluid; the coupling plates, in their entirety, are divided into at least two functionally different sets of coupling plates each of which set comprises first and second coupling plates and forms separated axial regions positioned one behind the other; at least one set of coupling plates is provided with means allowing the first or the second coupling plates to be controllably connected to, or separated from, the respective coupling part.

12 Claims, 3 Drawing Sheets

APPARATUS AND METHOD FOR CONTROLLABLE VISCOUS COUPLING

BACKGROUND OF THE INVENTION

The invention relates to a viscous coupling for lockingly connecting two parts which are rotatable relative to one another, having the following characteristics: a first coupling part is provided in the form of a rotational housing; a second coupling part is provided in the form of a hub; the first coupling part and the second coupling part are arranged so as to be rotatable relative to one another and, while being positioned co-axially inside one another, together form a sealed annular chamber; inside the chamber, there are axially arranged alternating first coupling plates in the shape of annular discs with means for providing a non-rotating connection with the first coupling part, and second coupling plates in the shape of annular discs with means for providing a non-rotating connection with the second coupling part; otherwise, the annular chamber is at least partially filled with a viscous fluid.

With couplings of said type, the shear forces in the viscous fluid cause a torque to be transmitted between the rotational housing and the hub, which shear forces occur between the first (outer) coupling plates and the second (inner) coupling plates, with the coupling plates being arranged parallel relative to one another and rotating relative to one another. As a rule, the viscous fluid is a high-viscosity silicone oil. The ability of the coupling to transfer torque is thus dependent on the existence of a relative speed between the rotational housing and the hub.

The use of viscous couplings of the present type is mainly based on the visco-transmission concept in motor vehicles wherein a first vehicle axle is permanently driven by the engine-gearbox unit and a second driving axle is driven by an auxiliary output by the engine gearbox unit via a viscous coupling of the present type. The operating principle of such drives consists in that when the driving axles rotate at identical speeds, i.e., under undisturbed driving conditions, only the first axle is driven, because under such conditions, the viscous coupling cannot transmit any torque. When slip occurs at the first driving axle, i.e. when the speed of the first axle does not correspond to the driving speed, the difference in speeds causes a transferable torque to be built up in the viscous coupling. Consequently, if traction is lacking at the first axle, torque is transmitted to the second axle to generate adequate driving forces. This behavior is not unproblematical under all circumstances, and in particular, it is not always compatible with the effective use of anti-lock braking systems and driving dynamics control systems.

In DE 38 34 555 C1 it has already been proposed to completely disconnect a viscous coupling—regardless of a relative speed between the housing and hub—in that the plates of the one coupling part are uncoupled from their coupling part, whereupon they are driven by the plates of the other coupling part at the speed of the plates of the other coupling part. A transmission of torque from the one coupling part to the other coupling part is thus eliminated, and the outer plates connected to the housing are coupled and separated in that annular coupling discs are inserted between said plates and that the outer plates are moved into a friction locking position relative to the coupling discs by being axially pressed together.

DE 40 36 230 C2 describes a viscous coupling of substantially the same type, but the inner plates, in principle, are freely rotatable relative to the hub and arranged so as to alternate with annular coupling discs which are held on the hub in a non-rotatable and axially movable way. By axially pressing together the inner plates and the coupling discs, they are moved into a friction-locking condition, so that the speed of the inner plates can be coupled to, or uncoupled from, that of the hub. Uncoupling can also be effected in response to different slip conditions.

BRIEF SUMMARY OF THE INVENTION

It is the object of the present invention to provide an apparatus and method for effecting viscous coupling of the above-mentioned type which comprises control mechanisms for improving adaptation to different driving conditions. The objective is achieved in that the coupling plates, in their entirety, are divided into at least two functionally different sets of coupling plates each of which set comprises first (outer) and second (inner) coupling plates and forms separated axial regions positioned one behind the other and that at least one set of coupling plates is provided with means for allowing the first (outer) or the second (inner) coupling plates to be controllably connected to, or separated from, the respective coupling part. According to a first embodiment, it is proposed that a first set of first and second coupling plates is non-rotatably connected to the respective coupling part and that the second set of first and second coupling plates comprises means allowing the first or the second coupling plates to be controllably coupled to, and separated from, the respective coupling part. According to a further embodiment it is proposed that two sets of first and second coupling plates comprise means allowing the first or the second coupling plates of said sets, in a relatively stepped and controllable way, to be coupled to, and separated from, the respective coupling part. According to yet a further embodiment it is proposed that a first set of first and second coupling plates is non-rotatably connected to the respective coupling part and that two sets of first and second coupling plates comprise means allowing the first or the second coupling plates of said sets, in a relatively stepped and controllable way, to be coupled to, and separated from, the respective coupling part. The solution in accordance with the present invention differs from the attempt to control the coupling characteristics entirely via different slip values when coupling the coupling plates according to different characteristic curves; it differs in that it provides a simpler and less sensitively controllable device in which different preferred characteristic curves are predetermined by the design. To the extent that only said different characteristic curves are to be used for controlling purposes, the coupling and separating means can be simplified considerably because they can provide only two or three switching conditions to operate with two or three different characteristic curves. However, in principle, it is also possible to operate with different characteristic curves by setting a permanent slip value.

If, according to the first or the third embodiment, it is proposed that a first set of coupling plates is provided with first and second coupling plates which are permanently coupled to the housing and hub respectively, it is ensured that the coupling is permanently set to transfer a small torque, thus achieving the desired damping effect in the driveline, as a result of which backlash symptoms in the driveline can be damped, i.e. any play-related changes in contact in the driveline, especially in universal joints, are less violently transmitted to the engine-gearbox unit. These characteristics with only a slight locking effect are preferably set for maneuvering purposes, with detection taking place via a certain minimum steering angle, when using the anti-lock braking system for braking purposes and the driving dynamics control system.

On the other hand, the highest possible locking effect has to be set when starting the vehicle (from the stationary condition, first gear), when operating with an off-highway reduction stage (if available) and when reversing.

If the above-mentioned preferred embodiment comprises a total of three functionally different sets of coupling plates, it is proposed that, at an increased driving speed, e.g., at a speed in excess of 80 km/h, use is made of a mean characteristic curve, i.e., that one set of the two connectable sets is connected in addition to the permanently engaged set of coupling plates. As compared to maximum connection, this leads to a reduction in fuel consumption.

As already mentioned in connection with the above-referenced state of the art, in this case, too, the preferred means for controllably coupling and separating first or second coupling plates rotatably arranged in the chamber and provided for coupling and separating purposes are provided in the form of coupling discs which are positioned between said coupling plates, which are non-rotatably connected to the respective coupling part and are axially movable in the chamber, as well as setting means for axially displacing the coupling plates and the coupling discs against an abutment. If there are provided two functionally different controllable sets of coupling plates, it is proposed that the means for carrying out controllable coupling and separating operations act directly on the one set of coupling plates which is supported on a resiliently supported abutment which, in turn, acts directly on the second set of coupling plates which are supported on an axially fixed abutment. In such a case, as the setting forces and the setting distance increase, first the one set is connected and then the other set wherein the spring force of the abutment must be suitable for moving the first set of coupling plates into a position of complete friction locking relative to the coupling discs.

As is also known from the state of the art, a setting device for actuating means for carrying out controllable coupling and separating operations can comprise two cam discs which are rotatable relative to one another and of which one is axially fixed and the other one axially movable relative to the housing; the axially fixed cam disc can be rotatably drivable and the axially displaceable cam disc in non-rotatable and can act via a pressure bearing on a pressure plate which rotates together with the housing and which forms part of the means for controllably carrying out coupling and separating operations. For the setting device, there is preferably provided an electric drive: to achieve rapid reaction times, both the coupling operation and the separating operation are carried out electrically, so that the reaction speed is only negligibly dependent on the returning force of said springs. Stationary conditions are maintained electrically by providing constant voltage. There is no need for a holding brake. Only when the electric motor is set currentless, return is effected by the spring force, so that the coupling plates are separated from the coupling discs and uncoupled from the housing.

BRIEF DESCRIPTION OF THE DRAWINGS

The present invention will be better understood if the written description thereof is read with reference to the accompanying drawings, of which.

DETAILED DESCRIPTION OF THE INVENTION

Figure 1:
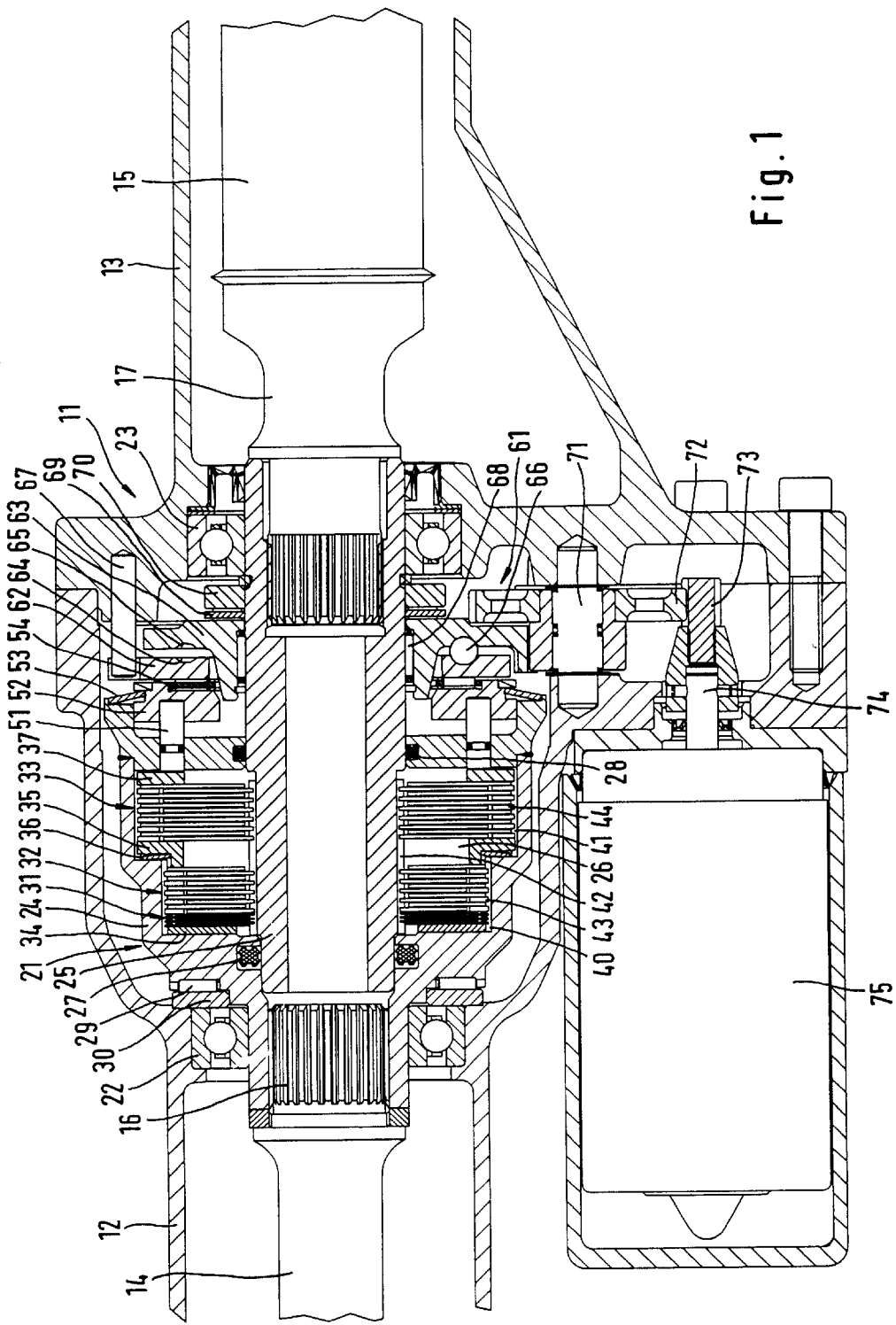
FIG. 1 shows an inventive viscous coupling with a setting drive in an attached housing.

FIG. 1 shows an attached housing 11 comprising two housing halves 12, 13. The one housing half 12 can be bolted to a gearbox and the second housing half 13 can be provided in the form of a transaxle tube and bolted to the differential housing of a second driving axle. In the housing half 12 there is arranged a solid shaft 14 which can be connected to an auxiliary output of the gearbox. In the housing half 13 there is positioned a tubular shaft 15 which leads to the second driving axle. The above description is based on the assumption that the viscous coupling is arranged near the engine-gearbox assembly.

In a further variant the tubular shaft 15 can be connected to the auxiliary output of a gearbox, in which case the housing half 13 is bolted to said gearbox, with the solid shaft 14 constituting the input shaft of the differential drive of the second driving axle; in such a case the housing half 12 can be provided in the form of a transaxle tube and connected to said differential drive, and the viscous coupling would be removed from the engine-gearbox unit and mounted in the vicinity of the second driving axle.

The attached housing can also have a compact design, in which case one of the shafts 14, 15 can be followed by a driveshaft.

In the housing 11, a viscous coupling 21 is rotatably supported by means of two rolling-contact bearings 22, 23. A toothed shaft journal 16 is integrally connected to the solid shaft 14 and inserted into a housing 24 of the viscous coupling 21 because said housing is held directly in the rolling contact bearing 22. A journal 17 with end toothing is welded to the tubular shaft 15 and non-rotatably inserted into a hub 25 of the viscous coupling 21. The hub 25 is directly supported in the rolling contact bearing 23. The housing 24 and the hub 25, together, form a chamber 26 which is sealed outwardly by seals 27, 28 between the housing and hub. Towards the left, the housing 24 is supported on the housing 11 by means of an axial bearing 29 and a pressure plate 30. The chamber 26 receives the following components which axially follow one another from the left to the right: an abutment disc 34, a first set of coupling plates 31, a second set of coupling plates 32, an abutment disc 35 supported on a plate spring 36 in the housing, a third set of coupling plates 33 and a pressure plate 37. In the region of the first and second sets of coupling plates 31, 32, the housing 24 comprises a smaller inner diameter, and in the region of the abutment plate 35, the plate spring 36 and the third set of coupling plates 33, the housing 24 comprises a larger diameter. In the region of the smaller diameter the housing is provided with inner toothing 40 and in the region of the larger inner diameter the housing is provided with inner toothing 41. The hub comprises continuous outer toothing 42 in the region of the chamber 26. On the first inner toothing 40 in the housing 24, the following components are held so as to be non-rotatable and axially movable: first coupling plates of the first set of plates 31; annular coupling discs 43 which axially alternate with the first coupling plates of the second set of coupling plates 32; the latter coupling plates, by means of their outer edge, extend into the region between the coupling discs 43 and do not contact the housing 24. On the second inner toothing 41 of the housing, there are arranged non-rotatable and axially movable annular coupling discs 44 which axially alternate with the first coupling plates of the third set of coupling plates 33; the latter coupling plates do not contact the housing 24 and, by means of their outer edge, extend into the region between the coupling discs 44. On the outer toothing 42 of the hub, all second coupling plates of the first, second and third sets of coupling plates 31, 32 and 33 are arranged by means of corresponding counter toothings so as to be non-rotatable and axially movable. Into the housing, there are inserted a plurality of axis-parallel pressure journals 51 which are held in a pressure plate 52 which is supported by means of a plate spring 53 towards the left on the housing 24. The rebounding plate spring 53 displaces the pressure plate 52 towards the right and thus pulls the journal 51 out of the housing 24. When the pressure plate 52 is displaced towards the left against the compressing plate spring 53, the journals 51 are able to act on the pressure plate 37 positioned in the chamber. The pressure plate 52 can be axially loaded via a pressure bearing 54 by a setting device 61 which substantially consists of two ramp discs 62, 63 in which there are formed groove ramps 64, 65 between which there run at least three circumferentially distributed balls 66. By rotating the two ramp discs 62, 63 relative to one another, the effective groove depth in each ball position is changed, so that the axial distance between the two ramp discs 62, 63 also changes. The ramp disc 62 is held in a non-rotatable way in the housing 11 by a stop journal 67 inserted into the housing 11. By means of a radial bearing 68, the ramp disc 63 is held on the hub so as to be rotatable relative to the housing 11, and by means of an axial bearing 69 and a pressure disc 70 it is axially supported towards the right in the housing 11. The ramp disc 63 is rotatable by means of a gearwheel 72 supported on the journal 71 in the housing 11. The gearwheel 72, in turn, is drivable by means of a driving pinion 73 which is connected to the shaft 74 of a housing 11 bolted to a driving motor 75.

In the illustrated position of the setting drive, the two ramp discs 62, 63 are arranged as close to one another as possible, the plate spring 53 is as untensioned as possible and the journals 51 do not act on the pressure disc 37. In this position, the first coupling plates of the second and third sets of coupling plates are axially released from the coupling discs 43, 44, so that only the first coupling plates of the first set of coupling plates 31 are firmly coupled to the housing 24. When the hub 25 is rotatingly driven, all second coupling plates of all three sets of coupling plates 31, 32, 33 are driven by the hub 25. Via shear forces in the viscous fluid, the inner coupling plates of the second and third sets 32, 33 drive the outer coupling plates, which are uncoupled from the housing, at an identical speed, so that only a minimum amount of torque is transmitted between the outer coupling plates and the coupling discs. If the first coupling plates are firmly coupled to the housing and if the second coupling plates are firmly coupled to the hub, a small amount of torque is transmitted in the region of the first set of coupling plates 31 due to the shear forces in the viscous fluid.

If the setting drive 61 is actuated to an extent where the ramp discs begin to move away from one another, the journals 51 act via the pressure disc 37 on the outer coupling plates and on the coupling discs 44 of the third set of plates 33, which are pressed together while being supported on the abutment disc 35. In this way, the coupling discs 44 non-rotatably couple the outer coupling plates to the housing 24, as a result of which a substantially increased amount of torque can be additionally transmitted as a result of the shear effect in the viscous fluid between the outer coupling plates and the inner coupling plates of the third set of coupling plates 33. The abutment disc 35 is initially held by the plate spring 36 in its original position. In this way, the outer coupling plates of the second set of coupling plates 32 continue to be uncoupled from their coupling discs 43 and thus from the housing 24.

If the setting drive 61 is actuated further so that the ramp discs 62, 63 continue to spread apart, with the journals 51 being displaced further to the left, the entire third set of coupling plates 33, together with the abutment disc 35, is displaced to the left against the force of the plate spring 36, so that the abutment disc 35 now acts as a setting device on the outer coupling plates and the coupling discs 43 of the second set of coupling plates 32. The outer coupling plates of this set of plates are now coupled to the housing 24, so that shear forces are now also built up in the viscous fluid between the outer coupling plates and the inner coupling plates of this second set 32, as a result of which again additional torque is transmitted.

Depending on the design, the outer coupling plates and the coupling discs 43 of the second set 32 can axially act on the coupling plates of the first set 31 which are then supported on the abutment plate 34, and the coupling plates of the first set of coupling plates 31 can be pressed together to such an extent that there occurs solid member friction so that the transmitted torque is increased once again. However, it is also possible to free the coupling plates 31 of the first set from said effect in that, for example, spacing rings might be inserted between the first coupling plates and also between the second coupling plates of the first set 31.

Because the setting drive 61 can be controlled so precisely it is possible to couple the outer coupling plates of the second and third sets 32, 33 by means of the compressible coupling discs 43, 44 with permanent slip, so that the characteristics of the coupling are not defined by fixed characteristic curves, but spread to form a characteristic field in which every point can be made to operate in a stationary way.

Figure 2:
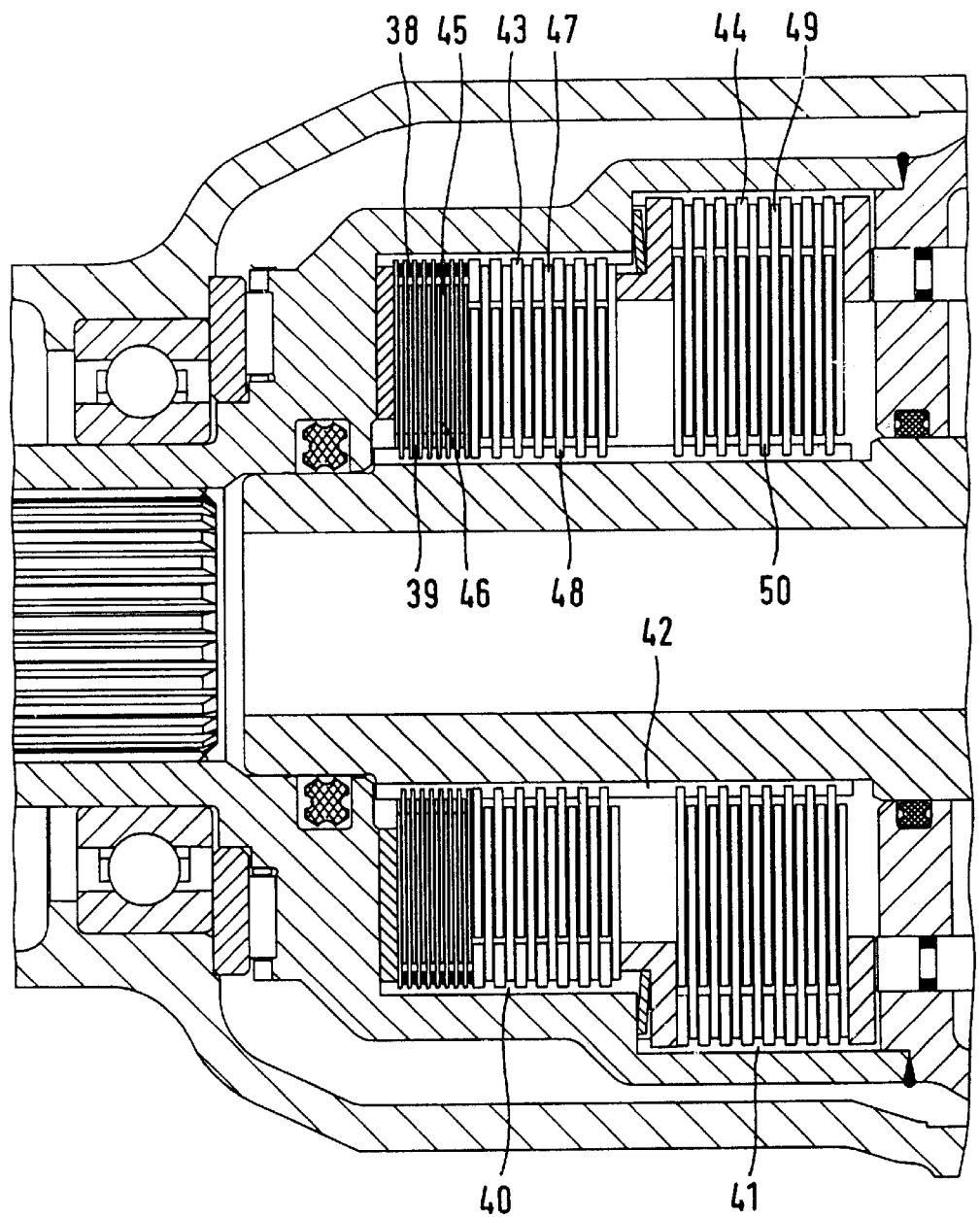
FIG. 2 shows a viscous coupling according to FIG. 1 in an identical design, but in the form of an enlarged detail.

FIG. 2 shows the same details as in FIG. 1, provided with the same reference numbers as in FIG. 1 Furthermore, there are shown further details which have been given reference numbers in FIG. 2 only. First outer coupling plates 45 of the first set are held on the toothing 40 and second inner coupling plates 46 of the first set 31 are held on the toothing 42 in a non-rotatable and axially movable way. First outer coupling plates 47 of the second set 32 are axially movable and freely rotatable relative to the toothing 39, whereas second inner coupling plates 48 of the second set 32 are held in a non-rotatable and axially movable way on the toothing 42. Finally, first outer coupling plates 49 of the third set 33 are axially movable and freely rotatable relative to the toothing 42, whereas second inner coupling plates 50 of the second set 33 are held on the toothing 42 so as to be non-rotatable and axially movable. Between each two first coupling plates 45 of the first set 31 there are positioned spacing rings 38, and between each two second coupling plates 46 of said set, there are positioned spacing rings 39. Between each two first outer coupling plates 47 of the second set 32 there are arranged coupling discs 43, whereas the second inner coupling plates 48 of said set are arranged so as to directly adjoin one another. Between each two first outer coupling plates 49 of the third set there are positioned coupling discs 44, whereas the second inner coupling plates 50 of said set directly adjoin one another.

Figure 3:
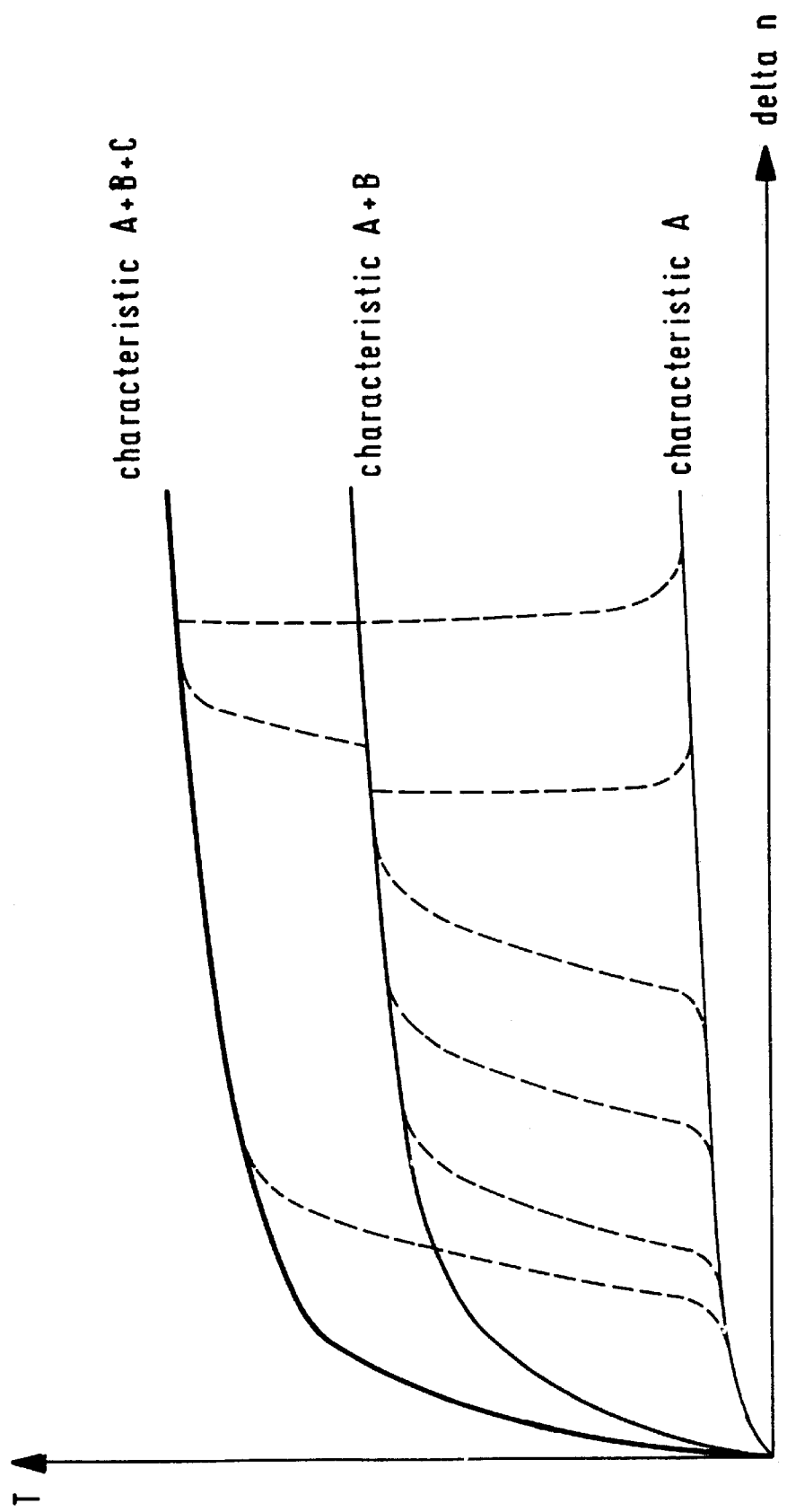
FIG. 3 shows a diagram with the characteristics of the inventive coupling.

FIG. 3 shows the transferable torque T as a function of the speed differential in between the parts of the viscous coupling.

A first lower characteristic curve corresponds to the characteristics of the first set of coupling plates 31. Locking values below said curve cannot be reached.

The second, much higher characteristic curve corresponds to the characteristics in cases where the third set of coupling plates 33 is connected. Finally, there is shown a third upper characteristic curve which corresponds to the characteristics when the second set of coupling plates 32 is also connected.

Dashed connecting lines between the first and the second and between the second and the third curve indicate that intermediate conditions can be operated and maintained in that the outer plates of the second and third sets are coupled to the housing with permanent slip.

Certain modifications and variations of the disclosed embodiments of the present invention will be apparent to those skilled in the art. It should be understood that the disclosed embodiments are intended to be illustrative only, and not in any way restrictive of the scope of the invention as defined by the claims set forth hereunder.

I claim:

1. A viscous coupling apparatus for lockingly connecting two parts which are rotatable relative to one another, comprising:
   (a) a first coupling part in the form of rotational housing (24);
   (b) a second coupling part in the form of a hub (25);
   (c) a sealed annular chamber (26) at least partially filled with a viscous fluid, and formed by said first coupling part and said second coupling part, which are rotatable relative to one another and positioned co-axially inside one another;
   (d) axially alternating first coupling plates in the shape of annular discs, with means for providing a non-rotatable connection of said alternating first coupling plates with said first coupling part; and
   (e) second coupling plates in the shape of annular discs, with means for providing a non-rotatable connection with said second coupling part, said first coupling plates and said second coupling plates are arranged inside said chamber (26); and cooperating with each other through shear forces occurring in said viscous fluid;
   (f) said coupling plates, in their entirety, being divided into at least two functionally different sets of coupling plates (31, 32, 33), each of said sets comprising alternating first and second coupling plates and forming separated axial regions positioned one behind the other; and
   (g) at least one set of coupling plates (32, 33) being provided with means allowing said first or said second coupling plates to be controllably coupled to, and separated from, the respective coupling parts; and further comprising an abutment, and wherein said first or second coupling plates provided for controllable coupling and separating operations are rotatably positioned in said chamber, and said means for carrying out a controllable coupling and separating operation comprises (i) coupling discs which are inserted between said coupling plates, which are non-rotatably connected to the respective coupling part and which are axially movable in the chamber, and (ii) setting means for axially moving said coupling plates and said coupling discs against said abutment.

2. A viscous coupling as defined in claim 1, wherein a first set (31) of said first and second coupling plates is non-rotatably connected to the respective coupling parts (24, 25), and a second set (32) of said first and second coupling plates comprises means allowing said first or said second coupling plates of said set to be controllably coupled to, and separated from, the respective coupling part.

3. A viscous coupling as defined in claim 1, wherein said two sets (32, 33) of first and second coupling plates comprise means operative to cause the first or the second coupling plates of said sets, in a relatively stepped and controllable way, to be coupled to, and separated from, the respective coupling part.

4. A viscous coupling as defined in claim 1, wherein a first set (31) of first and second coupling plates is non-rotatably connected to the respective coupling parts and that two sets (32, 33) of first and second coupling plates comprise means operative to cause the first or the second coupling plates of said two sets, in a relatively stepped and controllable way, to be coupled to and separated from, the respective coupling part.

5. A viscous coupling according to claim 1, further comprising a resiliently-supported abutment (35) and an axially-fixed abutment (34), and wherein said means for controllable coupling and separating operations act directly on said one set (32) of coupling plates which is supported on said resiliently-supported abutment (35) and that the latter, in turn, acts directly on said second set of coupling plates, which are supported on said axially-fixed abutment (34).

6. A viscous coupling according to claim 5, wherein said coupling discs (43, 44) are held in said housing (24) and are arranged so as to alternate with said first outer coupling plates.

7. A viscous coupling according to claim 6, wherein a setting device (61) for actuating said means for carrying out controllable coupling and separating operations comprises two cam discs (62, 63) which are rotatable relative to one another and of which one is axially fixed, with the other one being axially movable relative to said housing (24).

8. A viscous coupling according to claim 7, wherein said axially fixed cam disc (63) is rotatably drivable and said axially movable cam discs (62) is non-rotatable and acts via a pressure bearing (54) on a pressure plate (53) which rotates with said housing (24).

9. A method of controlling a viscous coupling in a motor vehicle with a permanently driven axle and a selectively driven axle, said viscous coupling being arranged in the driveline so as to be associated with the latter axle, said viscous coupling being provided for lockingly connecting two parts which are rotatable relative to one another and comprising: a first coupling part in the form of a rotational housing (24) and a second coupling part in the form of a hub (25), said first coupling part and said second coupling part being arranged so as to be rotatable relative to one another and, while being positioned co-axially inside one another, together form a sealed annular chamber (26); axially alternating first coupling plates in the shape of annular discs with means for providing a non-rotatable connection with said first coupling part, and second coupling plates in the shape of annular discs, with means for providing a non-rotatable connection with said second coupling part, arranged inside said sealed annular chamber (26); and said sealed annular chamber (26) being at least partially filled with a viscous fluid, said method comprising essentially the step of: out of the total number of coupling plates of at least two functionally different sets of coupling plates (31, 32, 33), each comprising first and second coupling plates and forming separated axial regions positioned one behind the other, coupling either the first or the second coupling plates of at least one set of coupling plates (32, 33) to the respective coupling part or separating them therefrom; and further comprising the step of coupling the coupling plates of all sets to the respective coupling parts, for starting the motor vehicle from the stationary position and for reversing and, optionally, when selecting an off-highway reduction stage.

10. A method according to claim 9, comprising the steps of coupling the coupling plates of one part of said sets to the respective coupling part, and separating the coupling plates of the other part of said sets from the respective coupling part, both steps in response to a motor vehicle speed above a typical speed corresponding to a minimum speed on motorways.

11. A method according to claim 9, comprising the step of separating the coupling plates of the greatest possible part of sets from the respective coupling part in response to maneuvering the motor vehicle with a vehicle steering angle typical of any such operation.

12. A method according to claim 9, comprising the step of separating the coupling plates of a greatest possible part of sets from the respective coupling part when activating an anti-lock braking system and/or a driving dynamics control system in the vehicle.

* * * * *

UNITED STATES PATENT AND TRADEMARK OFFICE
CERTIFICATE OF CORRECTION

PATENT NO.   : 6,443,282 B1
DATED        : September 3, 2002
INVENTOR(S)  : Georg Kwoka It is certified that error appears in the above-identified patent and that said Letters Patent is hereby corrected as shown below:

Column 7,
Line 29, please delete "alternating".
Line 54, please insert -- and -- before "which are non-rotatably".

Signed and Sealed this

Eighth Day of April, 2003

JAMES E. ROGAN
*Director of the United States Patent and Trademark Office*